United States Patent

Campbell et al.

(12) United States Patent
(10) Patent No.: US 7,641,275 B2
(45) Date of Patent: Jan. 5, 2010

(54) PILLAR WIND DEFLECTOR

(75) Inventors: Brett A. Campbell, Ann Arbor, MI (US); Scott B. Smith, Milan, MI (US); Todd M. Remtema, Milford, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 123 days.

(21) Appl. No.: 11/759,729

(22) Filed: Jun. 7, 2007

(65) Prior Publication Data

US 2008/0306661 A1 Dec. 11, 2008

(51) Int. Cl.
*B62D 35/00* (2006.01)

(52) U.S. Cl. .............. 296/217; 296/180.1; 296/180.5; 296/193.06

(58) Field of Classification Search ......... 296/154.152, 296/146.16, 152, 154, 106, 180.1, 180.5, 296/217, 193.06
See application file for complete search history.

(56) References Cited

U.S. PATENT DOCUMENTS

| 2,308,057 | A | * | 1/1943 | Cooley | 49/334 |
| 2,338,965 | A | * | 1/1944 | Parsons | 49/334 |
| 2,477,888 | A |  | 8/1949 | Milne |  |
| 3,141,663 | A | * | 7/1964 | Voiles | 49/334 |
| 3,835,757 | A | * | 9/1974 | Shakespear et al. | 454/148 |
| 4,186,524 | A | * | 2/1980 | Pelchat | 49/324 |
| 4,396,224 | A |  | 8/1983 | Hayakawa et al. |  |
| 4,700,980 | A | * | 10/1987 | Jozefczak | 296/180.1 |
| 5,702,149 | A |  | 12/1997 | Sweeney |  |
| 5,876,086 | A | * | 3/1999 | Lagrou et al. | 296/146.11 |
| 6,128,860 | A | * | 10/2000 | Repp et al. | 49/398 |
| 6,899,376 | B1 | * | 5/2005 | Sullivan | 296/180.1 |
| 2007/0188122 | A1 | * | 8/2007 | Andrejciw | 318/483 |

OTHER PUBLICATIONS

Horinouchi, Nariaki; Cosmos-V, An Aerodynamic Noise Simulator, R&D Review of Toyota CRDL vol. 36 No. 4; pp. 1-7.

* cited by examiner

*Primary Examiner*—Patricia L Engle
*Assistant Examiner*—Pinel E Romain
(74) *Attorney, Agent, or Firm*—Gifford, Krass, Sprinkle, Anderson & Citkowski, P.C.

(57) ABSTRACT

A wind deflector noise reduction system is provided. The wind deflector noise reduction system particularly reduces or eliminates wind throb in a moving vehicle having a rear side window in an open position. The system includes a panel attached to the B-pillar of a motor vehicle and operable to move between a closed position and an open position. When the panel is in the open position, wind is deflected from entering the moving vehicle. An actuator associated with the panel and operable to move the panel between the closed and the open position can be energized by a controller. The controller can be activated by the user of the motor vehicle and/or by a sensor that detects the position of the rear side window.

20 Claims, 3 Drawing Sheets

PILLAR WIND DEFLECTOR

FIELD OF THE INVENTION

This invention relates generally to a motor vehicle noise reduction system. More specifically, the invention relates to a motor vehicle noise reduction system that reduces wind noise using a wind deflector.

BACKGROUND OF THE INVENTION

Most if not all motor vehicles experience acoustic noise when traveling down a road or highway with one or more of the windows in an open position. The acoustic noise can be classified as aerodynamic noise caused by temporal fluctuations of air flow around the body of the moving vehicle. One type of acoustic noise is called wind throb, which is a low frequency noise (approximately 10-50 hertz) that can occur within a motor vehicle compartment when a sunroof or side window is in an open position and the vehicle is in motion. If a sunroof is open and causing wind throb, a small device called a wind deflector can prevent the wind throb and make such phenomenon seldom noticeable. However, when driving with a side window open, occupants of a vehicle can experience wind throb when traveling at certain speeds and the use of a wind deflector has heretofore proven to be undesirable. Therefore, there is a need for an improved wind deflector noise reduction system for reducing wind noise in a motor vehicle.

SUMMARY OF THE INVENTION

A wind deflector noise reduction system is provided. The wind deflector noise reduction system particularly reduces or eliminates wind throb in a moving vehicle having a rear side window in an open position. The system includes a panel attached to a B-pillar of a motor vehicle and operable to move between a closed position and an open position. When the panel is in the open position, wind is deflected from entering the moving vehicle. An actuator associated with the panel and operable to move the panel between the closed and the open position can be energized by a controller. The controller can be activated by the user of the motor vehicle and/or by a sensor that detects the position of the rear side window.

In an embodiment of the present invention, the controller energizes the actuator to place the wind deflector in the open position when the window sensor senses the rear side window has moved from a closed position to an open position. In another embodiment, the controller energizes the actuator to open the wind deflector when the window sensor senses the rear side window has moved from the closed position to the open position of greater than 10 centimeters. In yet another embodiment, a vehicle movement sensor is included and operable to sense if the motor vehicle is moving. In this embodiment the controller energizes the actuator to open the wind deflector when the window sensor senses the first window has moved from the closed position to the open position and the vehicle movement sensor senses the motor vehicle is moving.

DETAILED DESCRIPTION OF THE PREFERRED EMBODIMENTS

The present invention comprises a method and a system for the reduction of acoustic noise, in particular wind throb, in a moving vehicle. As such, the present invention has utility as a method and system for providing a more quiet, comfortable and/or enjoyable ride for the motor vehicle driver and/or other occupants.

The wind deflector noise reduction system and method thereof of the present invention includes a wind deflector in the form of a panel, an actuator and a controller. A window sensor operable to sense a position of a window of the motor vehicle can also be included. The panel can be attached to a pillar located forwardly of the window and is actuatable to move from a closed position to an open position. The actuator is associated with and operable to place the panel in the open position and in a closed position. The controller, associated with the actuator, is operable to energize the actuator to place the wind deflector in the open position and thereby deflect wind from entering the motor vehicle window through the window. The system is activated by a user of the motor vehicle or in the alternative when the window sensor senses the window is open and communicates the open window position to the controller. The placement of the panel in the open position reduces or eliminates wind throb in the moving motor vehicle.

Figure 1:
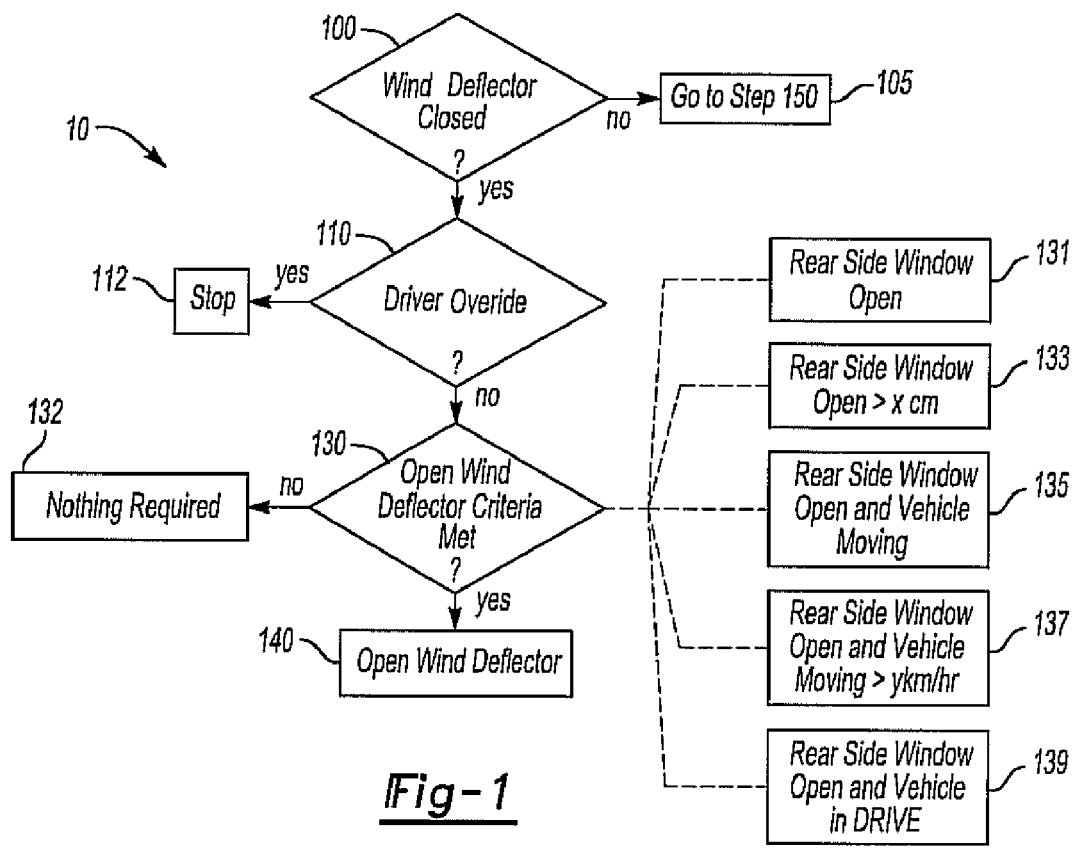
FIG. 1 is a logic diagram illustrating an embodiment of the present invention.

Referring now to FIG. 1, there is illustrated an embodiment of the present invention shown generally at 10 wherein an example of the logic of the wind deflector noise reduction system and method thereof is shown. In this embodiment, the system 10 inquires as to whether or not the wind deflector of the motor vehicle is closed at step 100. If the wind deflector is not closed, then the system 10 goes to step 150 shown in FIG. 2. In the alternative, if the wind deflector is closed, the system 10 inquires if there is a driver override not to open the wind deflector at step 110. If a driver override is in place or activated, the system 10 stops at step 112. If a driver override is not in place, the system 10 inquires as to whether or not a criterion or set of criteria for opening the wind deflector has been met at step 130. Any criterion or set of criteria can be established by the manufacturer and/or a user of the motor vehicle as to whether or not to open the wind deflector, illustratively including whether a rear side window located rearwardly of the wind deflector is open (step 131), whether a rear side window is open greater than a specified amount (step 133), whether the rear side window is open and the vehicle is moving (step 135), whether tile rear side window is open and the vehicle is moving greater than a specified speed (step 137) and/or whether the rear side window is open and the vehicle is in DRIVE (step 139). In an example, the criterion at step 133 is whether the rear side window is open greater than 5 centimeters. In another example, the criterion at step 133 is whether the rear side window is open greater than 10 centimeters. In yet another example, the criterion is whether or not the rear side window is open greater than 15 centimeters. It is appreciated that the wind deflector can be located on the B-pillar which is located forwardly of, and on the same side of the motor vehicle as, the rear side window in question.

The system and method of the present invention can afford for the user of the motor vehicle to set the amount the rear side window is open before the criterion illustrated at step 133 is met. The same is true for step 137 wherein the present invention affords for the manufacturer and/or user of the motor vehicle to determine and set what speed the motor vehicle must be traveling greater than in order for the criterion at step 137 to be met. In fact, it is within the scope of the present invention for the manufacturer and/or user of the motor vehicle to determine which, if any, criterion or set of criteria is to be established and/or selected at step 130.

If the open wind deflector criterion or set of criteria is not met at step 130 then nothing is required and the system returns back to step 100. In the alternative, if the desired criterion or set of criteria is met at step 130, then the wind deflector is opened at step 140.

Figure 2:
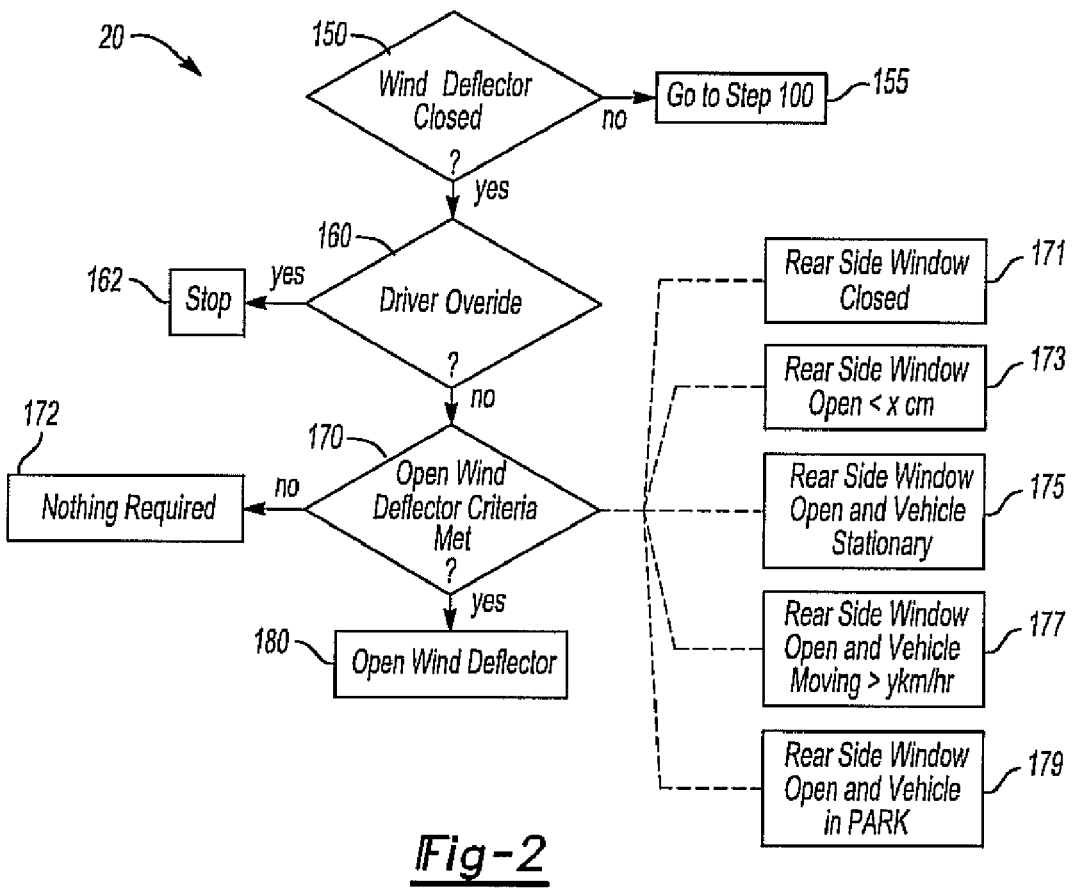
FIG. 2 is a logic diagram illustrating another embodiment of the present invention.

Turning to FIG. 2, another embodiment of the present invention is shown generally at 20. In this embodiment, the system 20 affords for placing the wind deflector in a closed position. The system 20 inquires as to whether the rear side window is open at step 150. If the rear side window is not open, the system 20 returns to step 100 of FIG. 1. In the alternative, if the rear side window is open, the system 20 inquires as to whether there is a driver override associated with automatically closing the wind deflector at step 160. If a driver override to not close the wind deflector is in place, the system 20 stops at step 162. If a driver override is not in place, the system 20 proceeds to step 170 and inquires whether or not a criterion or set of criteria regarding closing the wind deflector has been met. Any criterion or set of criteria can be established and used with the present invention, illustratively including whether the rear side window is closed (step 171), whether the rear side window has been closed less than a specified amount (step 173), whether the rear side window is open and the vehicle is stationary (step 175), whether the rear side window is open and the vehicle is moving less than a specified amount (step 177) and/or whether the rear side window is open and the vehicle transmission is in PARK (step 179). If a desired criterion or set of criteria has not been met then the system 20 does not initiate any action at step 172 and returns back to step 150. In the alternative, if a criterion or set of criteria has been met then the system 20 closes the wind deflector at step 180.

Figure 3:
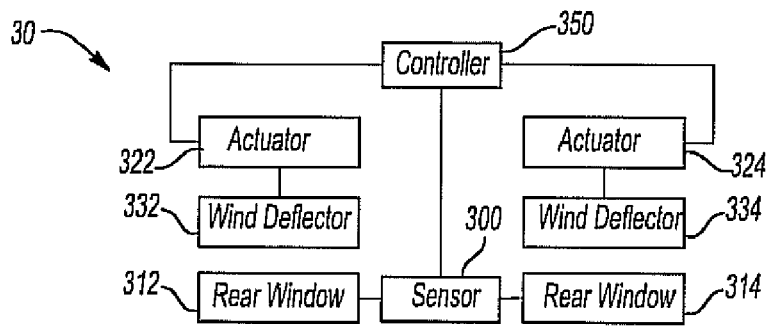
FIG. 3 is a schematic diagram of a noise reduction system of the present invention.
Figure 4:
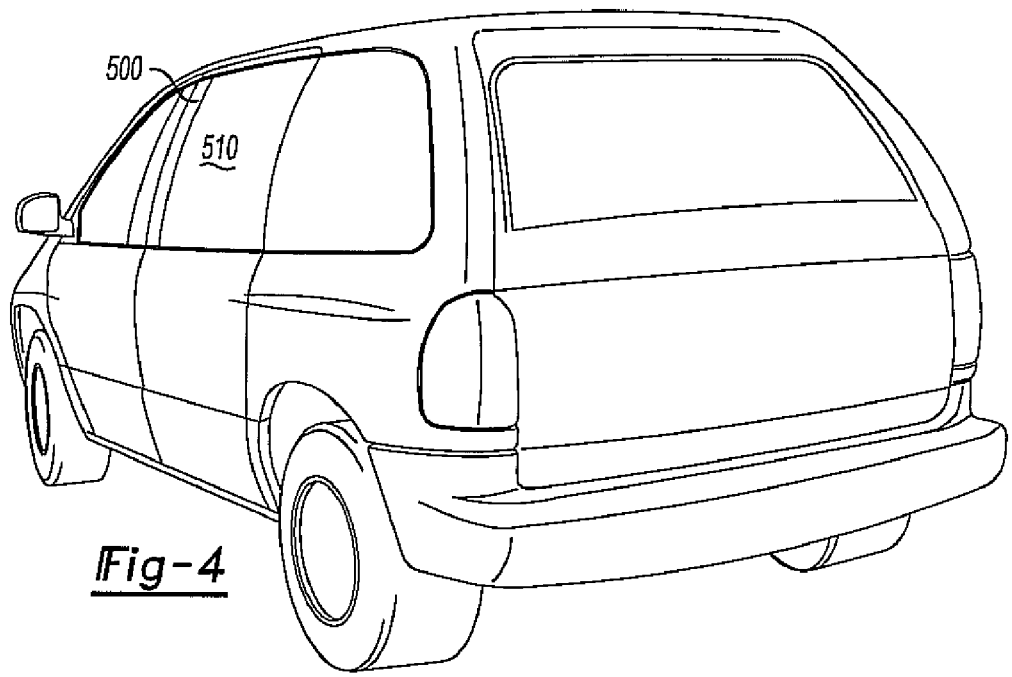
FIG. 4 is a perspective view of a motor vehicle on which the present invention can be used.

Turning now to FIG. 3, a schematic diagram 30 in accord with the present invention is illustrated. It is appreciated that the above discussion relating to FIGS. 1 and 2 regarding the logic of the system and method of the present invention is included in the discussion of the schematic diagram. The system includes a sensor 300 in communication with the rear side windows 312 and 314. Associated with each rear side window 312 and 314 is a wind deflector 332 and 334, respectively, located forwardly on the motor vehicle. The wind deflectors 332 and 334 can be attached to the respective B-pillar on the appropriate side of the vehicle. The window sensor 300 is associated with a controller 350, the controller associated with actuators 322 and 324. Upon opening one of the rear side windows, for example rear side window 312, the sensor 300 senses the window is in an open position. The sensor 300 communicates the open window position to the controller 350, and the controller 350 affords for the actuator 322 to open the wind deflector 332. In this manner, a system for opening a wind deflector attached to the B-pillar of a motor vehicle is provided.

It is appreciated that the sensor can be a switch that is activated when the rear side window is lowered or opened beyond a particular position. It is also appreciated that activation of the switch can actuate a lever system that affords for the opening of the wind deflector.

Figure 5:
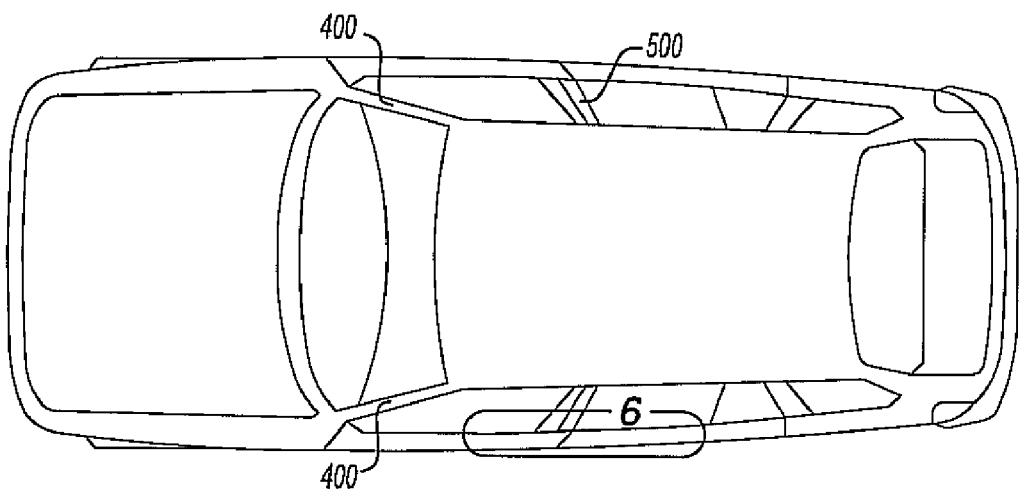
FIG. 5 is a top view of the motor vehicle shown in FIG. 4.
Figure 6:
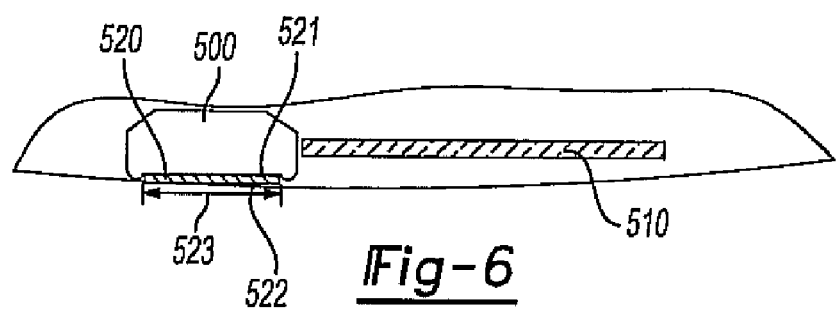
FIG. 6 is a top view of the section 6 shown in FIG. 5.

Turning now to FIGS. 4-8, an embodiment of the present invention is shown as attached to a motor vehicle. The motor vehicle shown in FIG. 4 has a B-pillar 500 and a rear side glass 510 located rearwardly from the B-pillar 500. The B-pillar 500 is located rearwardly from an A-pillar 400 as illustrated in FIG. 5. A top cross-sectional view of the section marked 6 in FIG. 5 is shown in FIG. 6 wherein a wind deflector panel 520 is in the closed position. The panel 520 has an inner surface 521 and an outer surface 522 bounded by a top edge 525, a bottom edge 527, a front edge 528 and a rearward edge 530. The inner surface 521 and outer surface 522 are generally parallel to the B-pillar 500 when the wind panel 520 is in the closed position.

Figure 7:
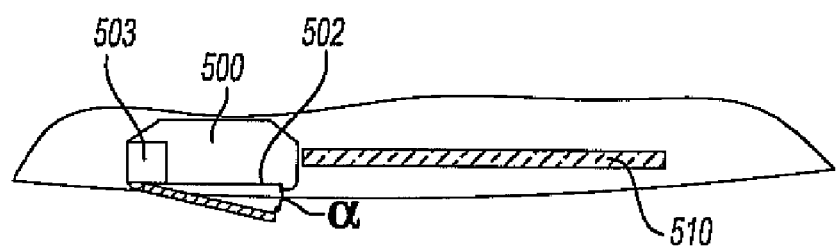
FIG. 7 is a top view of the section 6 shown in FIG. 5 wherein the wind deflector is in an open position.

FIG. 7 illustrates the panel 520 in the open position wherein the interior surface 522 of the panel 520 and an outer surface 502 of the B-pillar 500 form an angle $\alpha$ between each other. The panel 520 has a width dimension 523 that is generally equivalent to a width dimension of the B-pillar 500. In addition, the panel 520 has a height dimension 524 which is generally equivalent to a height dimension of the rear side window 510. For the purposes of the present invention, the term "generally equivalent" and "generally equal to" are defined to be equal to within ±20%.

Figure 8:
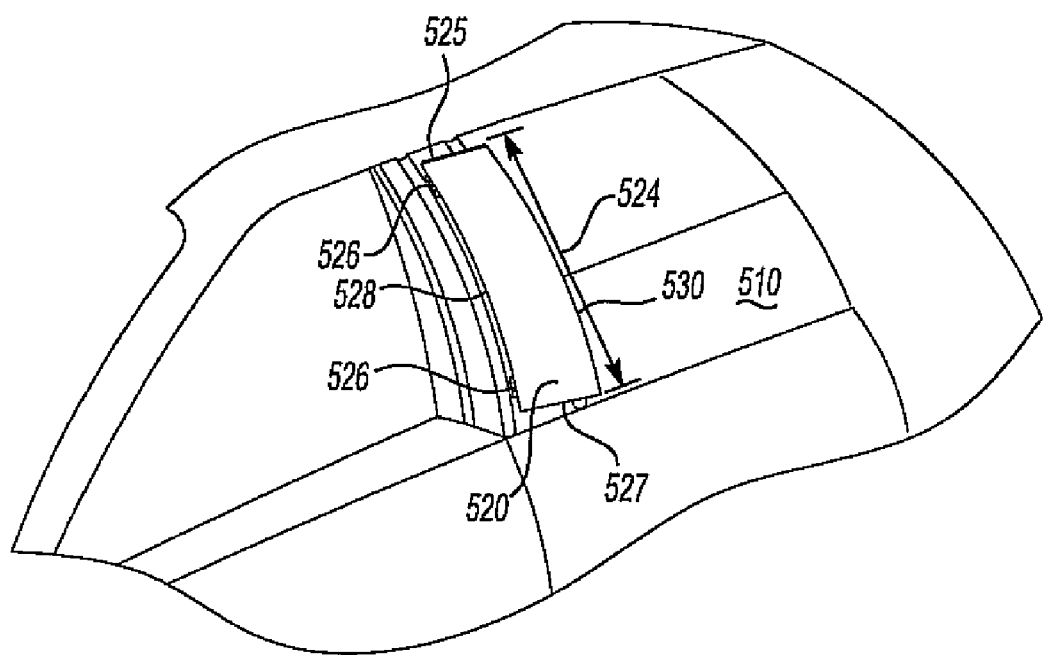
FIG. 8 is a perspective view of an embodiment of the present invention wherein the wind deflector is in an open position.

It is appreciated that the panel 520 can be attached to the B-pillar using any method known to those skilled in the art. As illustrated in FIG. 8, a hinge 526 attaches the panel 520 to the B-pillar 500. The hinge 526 affords for the rotation of the panel 520 about a generally vertical axis when moving between the closed position and the open position. In an example, the angle $\alpha$ between the panel 520 and the outer surface 502 of the B-pillar 500 is between 5 and 60 degrees when the panel is in the open position. In another example, the angle $\alpha$ between the panel 520 and the outer surface 502 is between 10 and 45 degrees when the panel is in the open position. In yet another example, the angle $\alpha$ between the panel 520 and the outer surface 502 is between 15 and 30 degrees when the panel is in the open position. It is also appreciated from FIGS. 4-8 that the B-pillar 500 has a generally planar surface with a front edge and a rear edge, and that panel 520 can be a rigid panel mounted parallel to the B-pillar 500. In addition, the front edge 528 and the rear edge 530 of panel 520 can be adjacent to the front edge and the rear edge of the B-pillar 500, respectively.

An actuator 502, shown schematically in FIG. 7, affords for the opening and closing of the panel 520. The actuator can be any type of actuator known to those skilled in the art, illustratively including an electric motor, a manual or powered lever, a pneumatic or hydraulic piston and the lice.

It is appreciated that the controller 350 can be in the form of a microprocessor and/or a series of switches. In addition, sensor 300 can include a plurality of sensors whereby a single sensor is associated with each rear side window of the motor vehicle. It is assumed that the rear side windows of the motor vehicle are power or electric windows, however this is not required.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A wind deflector noise reduction system for reducing wind noise in a motor vehicle having a window located rearwardly to a pillar of the motor vehicle, the system comprising:
   a pillar having a generally planar surface with a front edge and a rear edge;
   a panel extending over and mounted parallel to said generally planar surface of said pillar, said panel having a front edge adjacent to said front edge of said pillar and an unattached rear edge adjacent to said rear edge of said pillar, said panel pivotally attached to said pillar and operable to rotate about a vertical axis and move between a closed position and an open position, said rotation to the open position causing said rearward edge of said panel being pivoted outwardly from said pillar and operable to deflect wind from entering the moving vehicle;
   an actuator associated with said panel and operable to pivot said panel between said closed and said open position; and
   a controller operable to be activated to energize said actuator.

2. The invention of claim 1, wherein said panel has an inner surface with a length approximately equal to a height dimension of said window and a width approximately equal to a width dimension of said pillar, said inner surface being generally parallel with said pillar when said panel is in said closed position.

3. The invention of claim 2, wherein an angle between said panel inner surface and said pillar is between 5 and 60 degrees when said panel is in said open position.

4. The invention of claim 1, further comprising a hinge attached to said pillar and said panel.

5. The invention of claim 1, wherein said window is a rear side window.

6. The invention of claim 1, wherein said pillar is a B-pillar.

7. The invention of claim 1, wherein said controller is activated to energize said actuator by a user of the motor vehicle.

8. The invention of claim 1, further comprising a window sensor associated with said rear side window and operable to sense a position of said rear side window and communicate said rear side window position to said controller.

9. The invention of claim 8, wherein said controller is activated to energize said actuator when said window sensor senses said rear side window is in said open position and communicates said open window position to said controller.

10. The invention of claim 8, wherein said controller is activated to energize said actuator when said window sensor senses said rear side window is in said open position greater than 10 centimeters and signals said open window position to said controller.

11. The invention of claim 8, wherein said controller is activated to energize said actuator when said window sensor senses said rear side window is in said open position greater than an amount specified by a user of the motor vehicle and signals said open window position to said controller.

12. A method for reducing wind noise in a moving motor vehicle having a rear side window located rearwardly to a pillar of the motor vehicle, said method comprising the steps of:
   providing a pillar having a generally planar surface with a front edge and a rear edge;
   providing a panel extending over and mounted parallel to said generally planar surface of the pillar, the panel having a front edge adjacent to the front edge of the pillar and an unattached rear edge adjacent to the rear edge of the pillar, the panel pivotally attached to the pillar and operable to rotate about a vertical axis and move between a closed position and an open position, the rotation to the open position causing a rearward edge of said panel being pivoted outwardly from the pillar and operable to deflect wind from entering the moving vehicle;
   actuating the panel to move between the closed position and the open position using an actuator;
   controlling the actuator to move the panel between the closed position and the open position using a controller; and
   activating the controller so as to control the actuator to move the panel from the closed position to the open position when the window is moved from a closed position to an open position.

13. The method of claim 12, wherein the panel has an inner surface with a length generally equal to a height dimension of said window and a width generally equal to a width dimension of said pillar, the panel inner surface being generally parallel to the pillar when the panel is in the closed position.

14. The method of claim 12, wherein an angle between the panel inner surface and the pillar is between 5 and 60 degrees when the panel is in the open position.

15. The method of claim 12, further including:
   providing a hinge attached to the pillar and the panel.

16. The method of claim 12, wherein the window is a rear side window.

17. The method of claim 12, wherein the pillar is a B-pillar.

18. The method of claim 12, wherein the controller is activated to energize the actuator by a user of the motor vehicle.

19. The method of claim 12, further including:
   providing a window sensor associated with the window and operable to sense a position of the window and communicate the window position to the controller.

20. The method of claim 19, wherein the controller is activated to energize the actuator when the window sensor senses the window is in the open position and communicates the open window position to the controller.

* * * * *

UNITED STATES PATENT AND TRADEMARK OFFICE
CERTIFICATE OF CORRECTION

PATENT NO. : 7,641,275 B2  Page 1 of 1
APPLICATION NO. : 11/759729
DATED : January 5, 2010
INVENTOR(S) : Brett A. Campbell et al.

It is certified that error appears in the above-identified patent and that said Letters Patent is hereby corrected as shown below:

Column 2, line 60 replace "tile" with --the--

Column 4, line 55 replace "lice" with --like--

Signed and Sealed this

Twentieth Day of April, 2010

David J. Kappos
*Director of the United States Patent and Trademark Office*